US006530633B2

United States Patent
Morozumi et al.

(10) Patent No.: US 6,530,633 B2
(45) Date of Patent: Mar. 11, 2003

(54) CARD PRINTING METHOD AND APPARATUS

(75) Inventors: Kazuaki Morozumi, Okaya (JP); Kenichi Nakajima, Shimosuna-machi (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 09/838,026

(22) Filed: Apr. 18, 2001

(65) Prior Publication Data
US 2002/0006298 A1 Jan. 17, 2002

(30) Foreign Application Priority Data
May 15, 2000 (JP) ......................... 2000-142192

(51) Int. Cl.[7] .............................. B41J 3/00; H04N 1/40
(52) U.S. Cl. .......................................... 347/2; 358/449
(58) Field of Search .............................. 358/449, 451, 358/502, 1.12, 1.5, 1.7, 1.8; 347/2, 9, 37, 16

(56) References Cited

U.S. PATENT DOCUMENTS

| | | | | |
|---|---|---|---|---|
| 4,594,597 A | * | 6/1986 | Liu et al. ................. | 101/409 |
| 5,252,989 A | * | 10/1993 | Kawakami et al. ......... | 347/171 |
| 5,721,624 A | * | 2/1998 | Kumashiro et al. ........ | 358/450 |
| 5,762,431 A | * | 6/1998 | Pawelka et al. ........... | 271/225 |
| 5,825,996 A | * | 10/1998 | Davis et al. ............... | 358/1.12 |
| 5,966,145 A | * | 10/1999 | Miura et al. ............... | 347/33 |
| 6,155,680 A | * | 12/2000 | Belon et al. ............... | 271/225 |
| 6,239,817 B1 | * | 5/2001 | Meyer ....................... | 347/16 |

FOREIGN PATENT DOCUMENTS

| | | |
|---|---|---|
| JP | 11-129658 | 5/1999 |
| JP | 11-254657 | 9/1999 |

* cited by examiner

*Primary Examiner*—John Barlow
*Assistant Examiner*—Leonard Liang
(74) *Attorney, Agent, or Firm*—Hogan & Hartson, LLP (57) ABSTRACT

There are provided a card printing method and a card printing apparatus which are capable of preventing or minimizing the possibility of adhesion of ink to end faces of a card. The card printing apparatus prints on a card having a predetermined thickness by an ink jet printing method. A card feed mechanism feeds the card C. A print head carries out printing on the card being advanced, while performing reciprocating motions. A controller controls the card feed mechanism and the print head. The controller causes the print head to carry out beyond-edge printing in which ink droplets are ejected beyond opposite edges of the card, immediately before termination of ejection of the droplets when the print head is moved in one direction, and immediately before termination of ejection of the droplets when the print head is moved in another direction opposite to the one direction, if the beyond-edge printing is required.

18 Claims, 12 Drawing Sheets

CARD PRINTING METHOD AND APPARATUS

BACKGROUND OF THE INVENTION

1. Field of the Invention

This invention relates to a card printing method and a card printing apparatus which are capable of carrying out so-called beyond-edge printing on a card having a predetermined thickness.

2. Prior Art

Conventionally, a card printing method and a card printing apparatus of this kind have been proposed in Japanese Laid-Open Patent Publication (Kokai) No. 11-254657, which feed a card placed on a tray in one direction, and at the same time cause a print head to reciprocate in a direction orthogonal to the direction of feed of the card, thereby carrying out beyond-edge printing for ejecting ink droplets onto areas outside the opposite edge portions of the card. In this case, the card is placed on the tray such that it is fit into a shallow rectangular groove in an ink absorbent material arranged on the top of the tray, and the ink droplets ejected onto areas beyond the opposite edge portions of the card are absorbed by the ink absorbent material such that they are prevented from adhering to end faces of the card at the edges.

In the conventional card printing method and apparatus configured as above, adhesion and drying of ink repeatedly occurs in the ink absorbent material, so that this material suffers from clogging as time elapses. If the ink absorbent material is clogged as described above, the ink is sucked in contact portions between the ink absorbent material and the card by capillary action, thereby causing ink to readily adhere to the end surfaces of the card on the contrary.

Figure 12A:
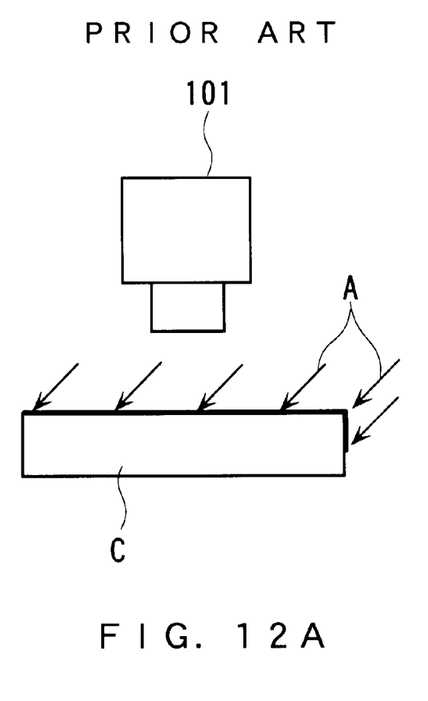
FIGS. 12A and 12B are diagrams which are useful in explaining the relationship between the card and ink droplets hitting thereon, according to the prior art.
Figure 12B:
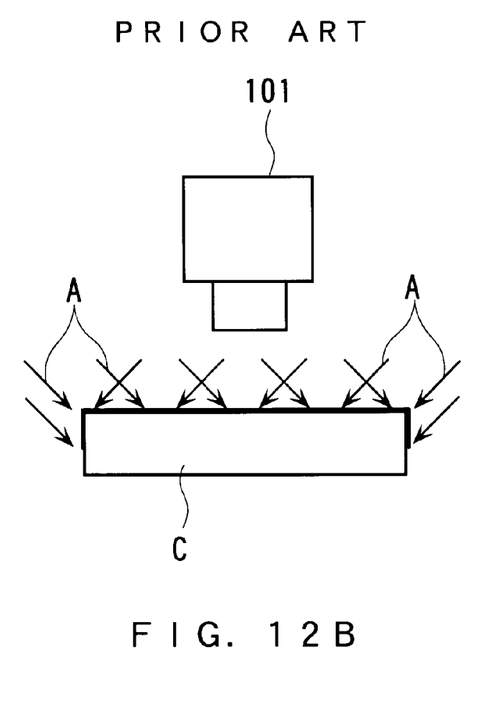

On the other hand, as shown in FIGS. 12A and 12B, when a print head 101 reciprocates while ejecting ink droplets A, the ink droplets A are ejected onto a card C in a relatively slanting direction to the direction of movement of the print head 101. If beyond-edge printing is carried out in a state in which the ink droplets A are ejected as above, the ink droplets A are actively caused to hit an end face on a rear side of the card C in the direction of movement of the print head 101. As a result, the ink positively adheres to the end face.

SUMMARY OF THE INVENTION

It is an object of the invention to provide a card printing method and a card printing apparatus which are capable of preventing or minimizing the possibility of adhesion of ink to end faces of a card.

To attain the above object, according to a first aspect of the invention, there is provided a method of printing on a card having a predetermined thickness by using a print head by an ink jet printing method.

The method according to the first aspect of the invention is characterized by comprising the steps of:

reciprocating moving the print head; and carrying out beyond-edge printing in which ink droplets are ejected beyond opposite edges of the card, immediately before termination of ejection of the droplets when the print head is moved in one direction, and immediately before termination of ejection of the droplets when the print head is moved in another direction opposite to the one direction.

To attain the above object, according to a second aspect of the invention, there is provided a card printing apparatus for printing on a card having a predetermined thickness by an ink jet printing method.

The card printing apparatus according to the second aspect of the invention is characterized by comprising:

a card feed mechanism for feeding the card;

a print head for carrying out printing on the card being advanced, while performing reciprocating motions; and a controller for controlling the card feed mechanism and the print head, the controller causing the print head to carry out beyond-edge printing in which ink droplets are ejected beyond opposite edges of the card, immediately before termination of ejection of the droplets when the print head is moved in one direction, and immediately before termination of ejection of the droplets when the print head is moved in another direction opposite to the one direction, if the beyond-edge printing is required.

According to the above card printing method and card printing apparatus, when beyond-edge printing is to be carried out at one edge of a card, the beyond-edge printing is carried out immediately before termination of ejection of ink droplets when the print head is moved in one direction, for instance, whereas when beyond-edge printing is to be carried out at an another edge of the card opposite to the one edge, the beyond-edge printing is carried out immediately before termination of ejection of ink droplets when the print head is moved in the other direction. In other words, beyond-edge printing on the edge portions of the card is not carried out immediately after the start of the ejection of ink droplets not only when the print head is moved in one direction but also when the print head is moved in the other direction.

The print head carries out printing operations by ejecting ink droplets during reciprocation, and therefore ink droplet shit (are ejected onto) the card from a relatively slanting direction. Therefore, if beyond-edge printing is carried out on the edge portions of the card immediately after the start of the ejection of ink droplets, the ink droplets hit the end faces of the end portions as well. In contrast, if beyond-edge printing is carried out on the edge portions of the card immediately before termination of ejection of ink droplets, the ink droplets do not hit the end faces of the end portions.

Preferably, a printing area printed when the print head is moved in the one direction and a printing are a printed when the print head is moved in the another direction opposite to the one direction extend from an intermediate portion of the card to the opposite edges of the card.

Preferably, the controller controls the card feed mechanism and the print head such that a printing area printed when the print head is moved in the one direction and a printing area printed when the print head is moved in the another direction opposite to the one direction extend from an intermediate portion of the card to the opposite edges of the card.

According to these preferred embodiments, in each printing operation during the advancing and returning motions of the print head, ejection of ink droplets is always started from the intermediate portion (preferably, a center line) of the card and terminated at locations beyond edge portions of the card, so that it is possible to cause the printing to be each time effected on approximately one of left and right halves of the whole card surface, by simple control.

In general, it is preferred that whenever the print head prints on one line, printing is carried out on approximately one half of the line on the card. If the card can be fed such that it is reciprocatingly moved, however, approximately one half of the whole card may be printed in each of forward and rearward printing operations.

Preferably, a printing area printed when the print head is moved in the one direction and a printing area printed when the print head is moved in the another direction opposite to the one direction overlap each other to form an overlapping area.

Preferably, the controller controls the card feed mechanism and the print head such that printing area printed when the print head is moved in the one direction and a printing area printed when the print head is moved in the another direction opposite to the one direction overlap each other to form an overlapping area.

According to these preferred embodiments, the left-hand side printing area and the right-hand side printing area are caused to overlap each other, whereby it is possible to prevent a faulty printing operation, such as thinned dots at the intermediate portion (boundary portion) of the card in comparison with the case in which printing is carried out for one half of the card each time. In short, inconsistencies in density at the boundary portion between the left-hand side and right-hand side printing areas can be eliminated.

Preferably, an amount of ink droplets ejected onto the overlap area per unit image and an amount of ink droplets ejected onto each non-overlapping area per unit image are adjusted to an identical amount.

Preferably, the controller adjusts an amount of ink droplets ejected onto the overlapping area per unit image and an amount of ink droplets ejected onto each non-overlapping area per unit image to an identical amount.

According to these preferred embodiments, it is possible to prevent color perception (print density) from changing between an image printed on the overlapping portion and an image printed on each non-overlapping portion. For instance, if the amount of ink droplets ejected onto each non-overlapping portion per unit image is set to 10, in the overlapping portion, the amount of ink droplets ejected during an advancing motion of the print head, and the amount of ink droplets ejected during a returning motion of the print head are set to 5, respectively. Alternatively, instead of setting the same amount, it is possible to set the amount ejected to the overlapping portion during an advancing motion to 7, and the amount ejected to the same during a returning motion to 3. Further, the amount of ink droplets ejected per unit image may be increased as the printing area is shifted to the non-overlapping portion.

Preferably, the printing is carried out by using a surface of the card having a droop portion formed thereon by blanking, as a recording surface for the printing.

Preferably, the card feed mechanism guides the card such that a surface of the card having a droop portion formed thereon by blanking, is used as a recording surface for printing.

According to these preferred embodiments, when a card is formed by blanking, an edge of one surface is raised sharply and slightly in the form of burrs. When the surface with this droop portion in the form of burrs is used as a recording surface for beyond-edge printing, it is possible to prevent ink droplets having hit an edge portion from flowing down an end face since the droop portion serves as a wall or a barrier to stop the flow of ink. That is, it is possible to prevent the ink droplets from adhering to an end face of the card.

Preferably, the method includes the step of tilting the card in a direction of movement of the print head such that the card lowers in a direction of movement during each printing operation carried out when the print head is moved in the one direction and when the print head is moved in the another direction opposite to the one direction.

Preferably, the card printing apparatus further includes a tilting mechanism for tilting the card brought to the print head such that the card performs sea-sawing motion, the tilting mechanism tilting the card in a direction of movement of the print head such that the card lowers in a direction of movement during each printing operation carried out when the print head is moved in the one direction and when the print head is moved in the another direction opposite to the one direction.

According to these preferred embodiments, the card is physically tilted, whereby hitting angles of ink droplets with respect to a direction perpendicular to the card surface can be relatively increased, thereby making it possible to minimize hitting of ink droplets onto end faces and adhesion thereof.

Preferably, the print head ejects ink droplets adjusted to be very fine, at least when printing is carried out on each of the opposite edges of the card.

Preferably, the controller causes the print head to eject ink droplets adjusted to be very fine, at least when printing is carried out on each of the opposite edges of the card.

According to these preferred embodiments, fine ink droplets are difficult to flow due to surface tension thereof. This makes it possible to prevent ink droplets having hit edge portions of the card from flowing toward end faces to the utmost.

Preferably, the method includes the step of wiping off ink adhering to end faces at the opposite edges of the card while advancing the card after termination of printing.

Preferably, the card printing apparatus further includes a wiping device arranged to face the card being advanced by the card feed mechanism after termination of printing, for wiping off ink adhering to end faces at the opposite edges of the card.

According to these preferred embodiments, for instance, when the printed card is delivered out of the apparatus, the opposite edge portions of the card are wiped out by making use of a card feeding operation, whereby it is possible to provide a card which does not cause the user to feel a sense of disorder.

Preferably, the method includes the step of scraping ink adhering to end faces at the opposite edges of the card while advancing the card after termination of printing.

Preferably, the card printing apparatus further includes a scraping device arranged to face the card being advanced by the card feed mechanism after termination of printing, for scraping off ink adhering to end faces at the opposite edges of the card.

According to these preferred embodiments, even if it is difficult to wipe off the ink adhering to the opposite edge portions of the card, the ink can be reliably removed, thereby making it possible to provide an attractive card which does not cause the user to feel a sense of disorder.

To attain the above object, according to a third aspect of the invention, there is provided a card printing apparatus for printing on a card having a predetermined thickness by an ink jet printing method.

The card printing apparatus according to the third aspect of the invention is characterized by comprising:

a card feed mechanism for feeding the card;

a print head for carrying out printing on the card being advanced, while performing reciprocating motions; and a controller for controlling the card feed mechanism and the print head, the card feed mechanism including feed roller means arranged at a location upstream of the print head in a direction of feed of the card and delivery roller means arranged at a location downstream of the print head in the direction of feed of the card, the controller controlling card feeding operations of the feed roller means and the delivery roller means such that the feeding operations are made synchronous with printing operations carried out by the print head.

According to this card printing apparatus, when the print head is carrying out a printing operation, the card feeding operations of the feed roller means and the delivery roller means are controlled, so that, for instance, even if the printing operation is started before the leading edge of the card reaches the delivery roller means, and even if the trailing edge of the card leaves the feed roller means when the printing operation is being continued, the card feeding operations are carried out with accuracy. Therefore, when beyond-edge printing is carried out on the opposite edge portions of the card on the leading edge side and the trailing edge side in the direction of feed of the card, forming of thinned dots can be prevented, and the beyond-edge printing can be carried out with accuracy.

The above and other objects, features, and advantages of the invention will become more apparent from the following detailed description taken in conjunction with the accompanying drawings.

DETAILED DESCRIPTION

Figure 1A:
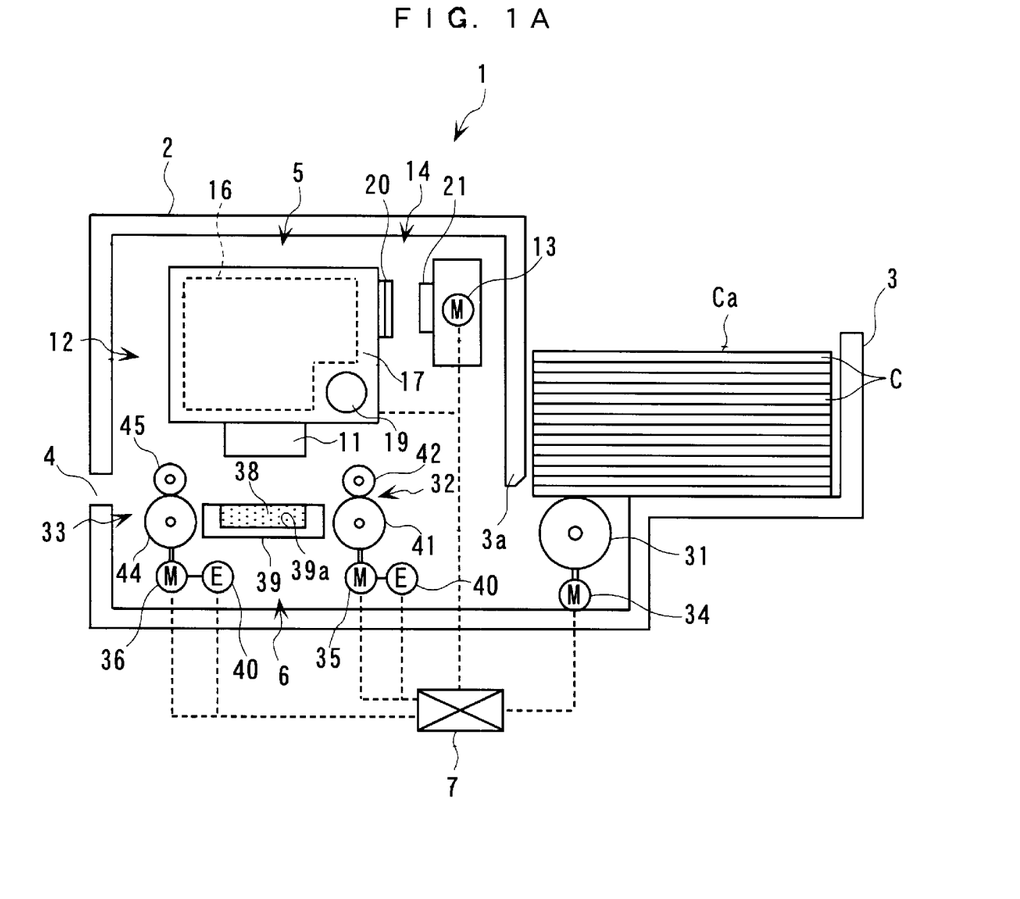
FIG. 1A is a side sectional view schematically showing a card printing apparatus according to an embodiment of the invention.
Figure 2:
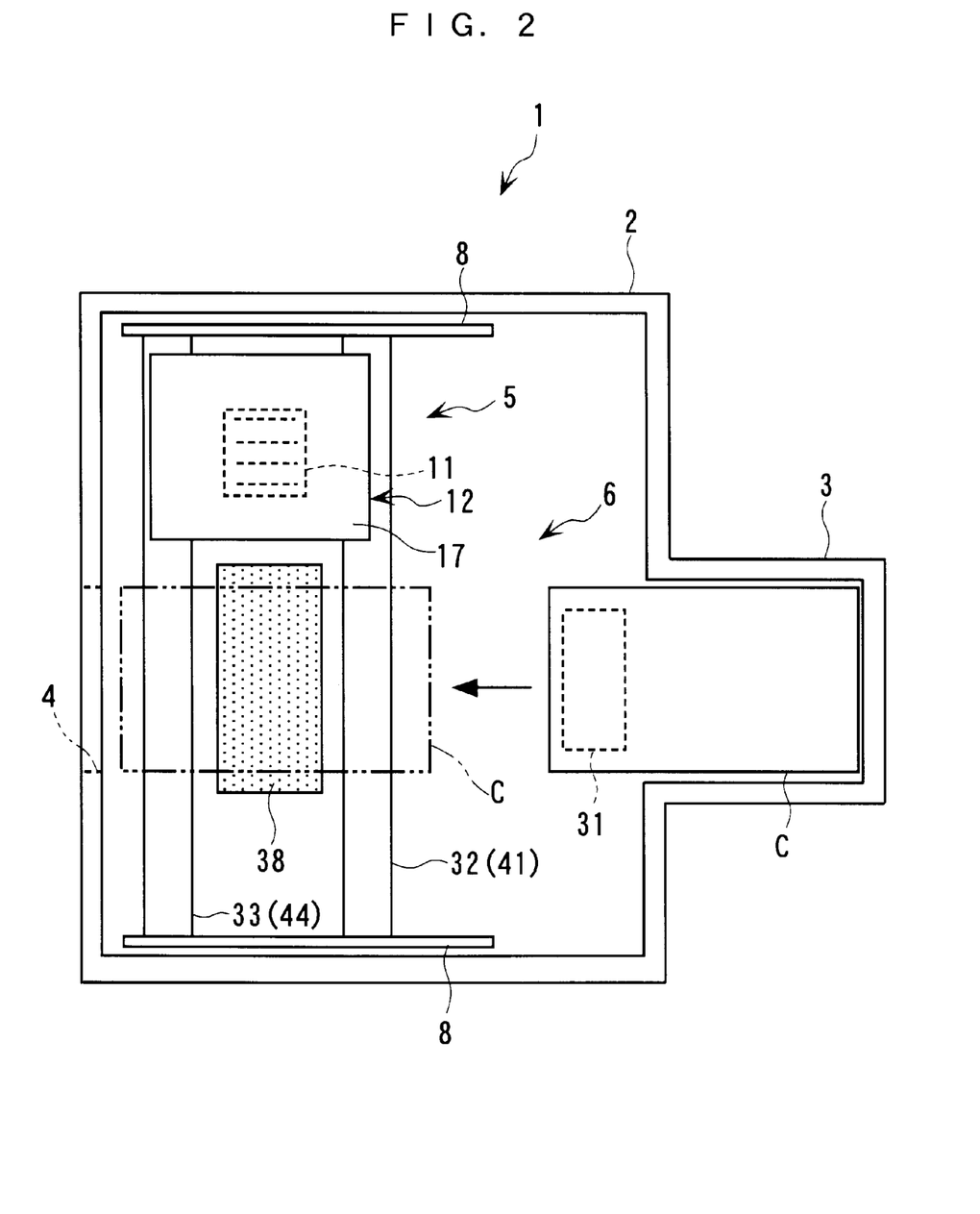
FIG. 2 is a plan sectional view schematically showing the card printing apparatus according to the embodiment.

The invention will now be described in detail with reference to drawings showing a card printing method and a card printing apparatus according to embodiments thereof. The card printing apparatus is capable of printing images, such as letters, figures, backgrounds, on a card, such as an ATM card, a membership card, having a predetermined thickness, by an ink jet printing method. The card printing apparatus is configured such that it is capable of performing so-called beyond-edge printing in which ink droplets are ejected beyond edge portions of the card C in view of printing a background of the card. FIGS. 1A and 2 are vertical and horizontal sectional views schematically showing the construction of the card printing apparatus. Referring to the figures, the card printing apparatus 1 includes an apparatus casing 2, a card-setting block 3 and a card exit 4 each formed in a part of the apparatus casing 2, a card printing mechanism 5 and a card feed mechanism 6 each incorporated in the apparatus casing 2, and a controller 7 for controlling the card printing mechanism 5 and the card feed mechanism 6.

A plurality of cards C for use in printing are set in the card-setting block 3 in a state lying one upon another, and introduced from the card-setting block 3 into the card printing mechanism 5 one by one by the card feed mechanism 6. The card C is fed by the card feed mechanism 6 such that card is brought to the card printing mechanism 5, starting with a leading edge thereof, and printed with a desired image by the card printing mechanism 5 by the ink jet printing method. The printed portion of the card C is delivered from the card exit 4 as the printing proceeds.

The card-setting block 3 is formed by laterally protruding a part of the apparatus casing 2 and has an inner shape approximately identical to the shape of the card C. Further, the card-setting block 3 has a predetermined depth enabling a plurality of cards C to be set in a state lying one upon another, and at the same time has a top thereof open such that the cards C can be put in or set from above. The cards C are set in the card-setting block 3 in a state in which a plurality of the cards C are lying one upon another with their recording surfaces Ca facing upward.

The card printing mechanism 5 includes a head unit 12 having a print head (ink jet head) 11, a carriage motor 13 serving as a drive source, and a reciprocating mechanism 14 driven by rotation of the carriage motor 13, for causing the head unit 12 to reciprocate in a direction orthogonal to a direction of feed of each card C. The head unit 12 is comprised of the print head 11 having an array of ink nozzles juxtaposed (in a plurality of lines) on a bottom surface thereof, an ink cartridge 16 for supplying inks (color inks) to the print head 11, and a carriage 17 on which are mounted the print head 11 and the ink cartridge 16.

The reciprocating mechanism 14 includes a carriage guide shaft 19 supported on a pair of left and right block frames, and a timing belt 20 extending in parallel with the carriage guide shaft 19. The carriage 17 is supported by the carriage guide shaft 19 such that it can be caused to reciprocate, and further the carriage 17 is rigidly fixed to a part of the timing belt 20. When the carriage motor 13 is driven for rotation, the timing belt 20 is driven in a forward or reverse direction by rotation of a pulley 21, whereby the head unit 12 is guided by the carriage guide shaft 19 for reciprocation. During this reciprocating motion of the head unit 12, ink droplets are ejected as required for carrying out printing on the card C.

The card feed mechanism 6 includes a supply roller 31 for sending out the cards Cone by one from the card-setting block 3, feed roller means 32 for feeding each card C sent from the supply roller 31 to a print position of the head unit 12, and delivery roller means 33 for delivering the card C sent from the feed roller means 32 out of the apparatus from the card exit 4. In this embodiment, the feed roller means 32 and the delivery roller means 33 are arranged at respective upstream (rear-side) and downstream (front-side) locations in the direction of feed of the card C with respect to the print head 11. The supply roller 31, the feed roller means 32, and the delivery roller means 33 are driven for rotation by a supply motor 34, a feed motor 35, and a delivery motor 36 as drive sources, respectively.

Arranged between the feed roller means 32 and the delivery roller means 33 is an ink absorbent material 38 in a manner opposed to the print head 11. The ink absorbent material 38 is provided in a state fitted in a groove 39a of an ink absorbent holder 39 such that it is located in parallel with a feed path of the card C and at the same time at a location slightly below the same. In the embodiment, out of ink droplets ejected from the print head 11, ink droplets which miss the card C hit the ink absorbent material 38 and are absorbed thereby. Further, it is also possible to use the ink absorbent material 38 as an absorbent material for absorbing waste ink ejected from the print head 11 when a flushing operation is executed.

The supply roller 31 is arranged below a front portion of the card-setting block 3 such that the supply roller 31 is brought into rolling contact with an underside surface of an undermost card C. A front wall 3a forming a part of the card-setting block 3 has a bottom thereof extending downward to such a position as permits only the undermost card C to pass thereunder, whereby a card C lying upon the undermost card C is prevented from being moved forward even if it attempts to move together with the undermost card C being fed by the supply roller 31. This makes it possible to feed or advance the cards C one by one when the supply roller 31 is driven for rotation by the supply motor 34.

The feed roller means 32 is comprised of a feed drive roller 41 positioned below, for being driven for rotation by the feed motor 35, and a feed driven roller 42 positioned above for being brought into rolling contact with the feed drive roller 41 with the card C positioned therebetween. The feed driven roller 42, which is permitted to freely rotate and urged toward the feed drive roller 41 by a spring, not shown, sandwiches the card C between the same and the feed drive roller 41 in a manner urging the card C, and at the same time is driven for rotation by the rotation of the feed drive roller 41, thereby advancing the card C.

Similarly, the delivery roller means 33 is comprised of a delivery drive roller 44 positioned below for being driven for rotation by the delivery motor 36, and a delivery driven roller 45 positioned above for being brought into rolling contact with the delivery drive roller 44 with the card C positioned therebetween. The delivery driven roller 45, which is permitted to freely rotate and urged toward the delivery drive roller 44 by a spring, not shown, sandwiches the card C between the same and the delivery drive roller 44 in a manner urging the card C, and at the same time is driven for rotation by the rotation of the delivery drive roller 44, thereby advancing the card C.

Now, a controlling method of controlling the card feed mechanism 6 and the card printing mechanism 5 by the controller 7 is described hereinafter. In a sequence of printing operations, the card C received from the supply roller 31 is intermittently fed with intermittent rotations of the feed roller means 32 and the delivery roller means 33, and when the intermittent feed of the card C is stopped, the print head 11 is caused to reciprocate for carrying out a line of printing. More specifically, slight feed of the card C, the stop of feed of the card, and ejection of ink droplets performed by the print head 11 being intermittently moved are repeatedly carried out, whereby it is possible to print a desired image on the card C while being advanced to the card exit 4.

On the other hand, in the present embodiment, in view of a printing object being the card C, ink droplets are ejected by the print head 11 up to areas slightly beyond the four edges of the card C so as to positively print a background or the like up to all the four edges. In other words, the print head 11 is controlled such that the same is capable of performing beyond-edge printing in which ink droplets are ejected beyond the four edge portions of the card C.

Figure 3A:
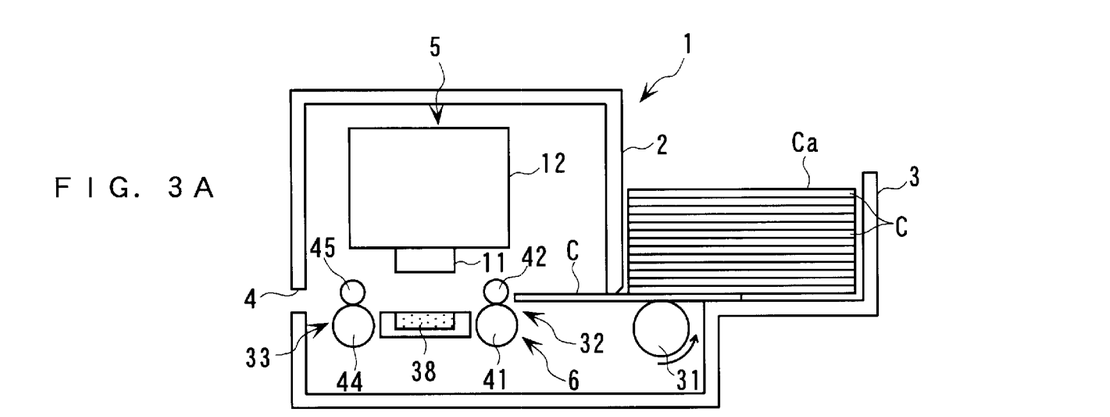
FIGS. 3A to 3C are diagrams which are useful in explaining a printing operation of the card printing apparatus according to the embodiment.
Figure 3B:
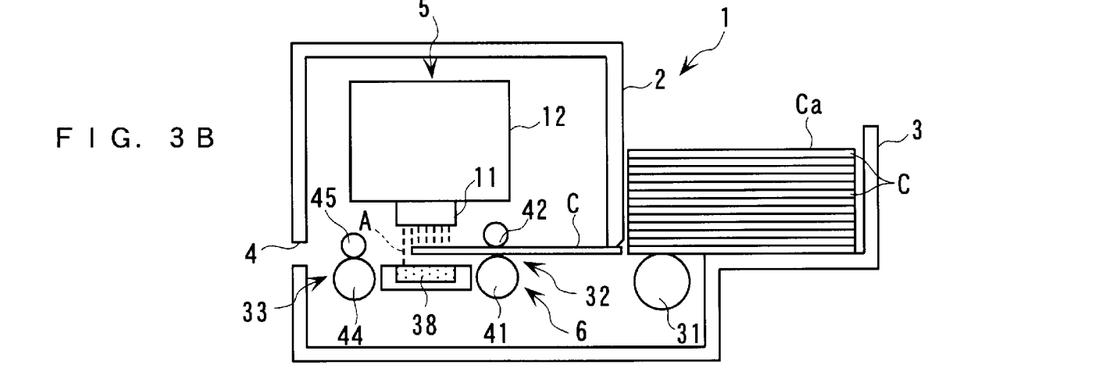
Figure 3C:
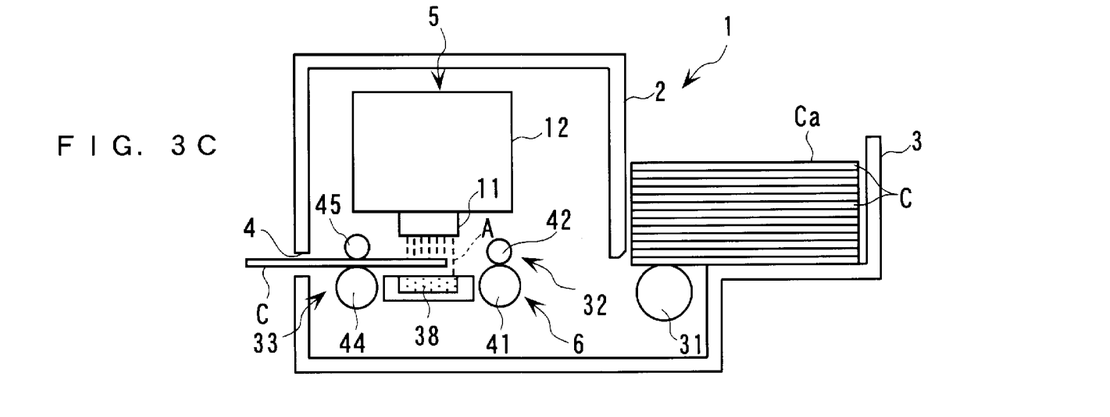

Referring to FIGS. 3A to 3C, a leading edge (front end) and a trailing edge (rear end) of the card C in the direction of feed thereof are printed during a time period over which the intermittent feed of the card C is stopped, as described above. Hence, a first line of printing and a last line of the printing are carried out on areas slightly off the leading edge and the trailing edge of the card C, respectively (by beyond-edge printing). Further, during the beyond-edge printing, the card C is fed by either of the feed roller means 32 and the delivery roller means 33. Therefore, in the present embodiment, a feeding speed of the feed roller means 32 (actually, feeding speed of intermittent feed thereof), and a feeding speed of the delivery roller means 33 (actually, feeding speed of intermittent feed thereof) are controlled such that they are made identical to each other.

More specifically, the feed motor 35 and the delivery motor 36 are implemented by DC motors respectively, and at the same time each of them has an encoder 40 connected thereto. The controller 7 controls the feed motor 35 and the delivery motor 36 based on the numbers of rotations of the respective DC motors detected by the encoders 40 such that the feeding speed of the feed roller means 32 and that of the delivery roller means 33 are made identical to each other (see FIGS. 1A and 1B). It should be noted that it is also possible to employ a stepping motor in place of a combination of the DC motor and the encoder.

Figure 1B:
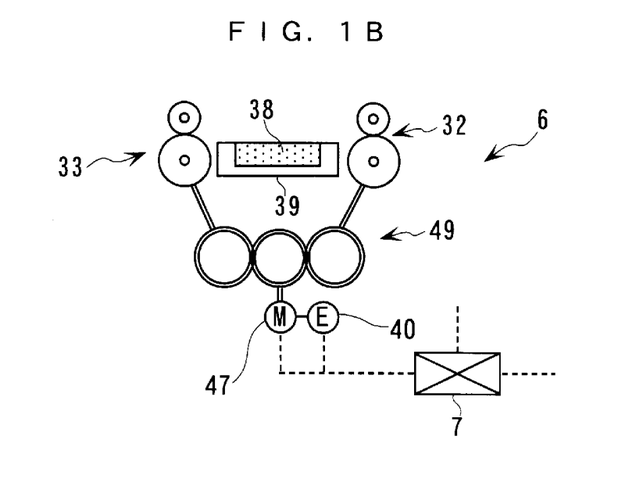
FIG. 1B is a side sectional view schematically showing a card-feeding mechanism of the card printing apparatus according to the embodiment.

In the present embodiment, since the card C is fed only in one direction, it is also possible to simplify the construction of the card feed mechanism 6, as shown in FIG. 1B. The card feed mechanism 6 shown in the figure is configured such that the feed motor 35 and the delivery motor 36 are driven by a single drive motor 48. In this case, a reduction gear train 49 is linked to the drive motor 48, and the torque of the drive motor 48 is branched by the reduction gear train 49 to be transmitted to the feed roller means 32 and the delivery roller means 33. This causes the feed roller means 32 to rotate at the same peripheral velocity as the delivery roller means 33.

On the other hand, when side edge portions of the card C are printed, ink droplets A ejected then during the reciprocating motion of the head unit 12 are caused to hit areas beyond the side edges of the card C to thereby carry out beyond-edge printing. In the above-mentioned beyond-edge printing for printing on the leading and trailing edge portions of the card C, the ink droplets A are ejected along opposite end faces of the card C in parallel therewith (FIGS. 3B and 3C). Therefore, the ink droplets A which have hit the leading and trailing edge portions of the card C hit the top surface of the card C, whereas the ink droplets A which deviate from the edge portions pass by the card C to hit the ink absorbent material 38. This prevents the ink droplets A from hitting the leading and trailing end faces of the card C.

On the other hand, in beyond-edge printing for printing on the side edge portions of the card C, the print head 11 ejects the ink droplets A while being reciprocatingly moved, thereby causing the ink droplets A to hit the card C from a relatively slanting direction. As a result, as shown in FIGS. 12A and 12B, the ink droplets A are caused to hit one side end face on this side of the card C in the direction of movement of the print head 101, from a slanting direction. Inversely, the ink droplets A cannot hit the other side end face of the card C on the remote side thereof in the direction of movement of the print head 101. To overcome this problem, in the present embodiment, the following method is adopted in view of the ink droplets A hitting (being ejected onto) the card C from a relatively slanting direction.

Figure 4A:
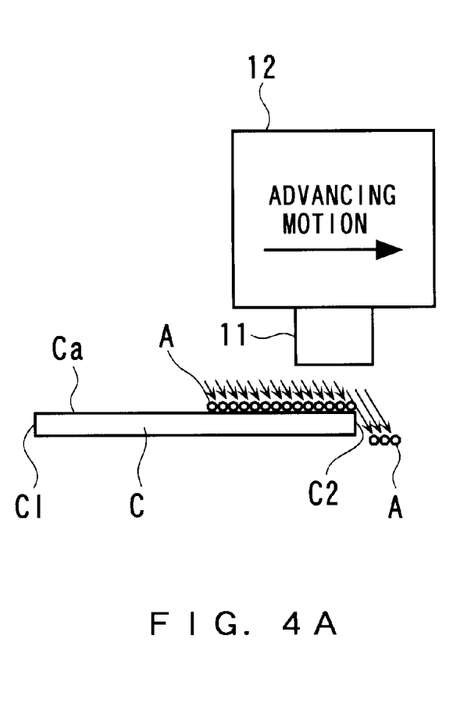
FIGS. 4A and 4B are diagrams which are useful in explaining beyond-edge printing of the card printing apparatus according to the embodiment.
Figure 4B:
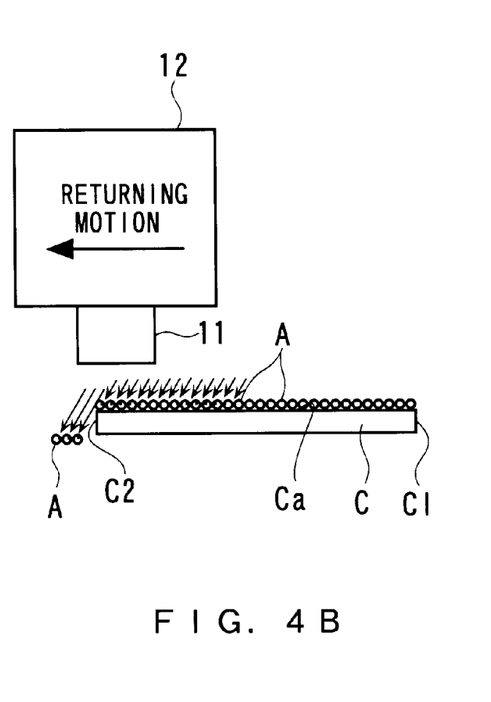

Referring to FIGS. 4A and 4B, when beyond-edge printing is carried out in the direction of movement (reciprocation) of the print head 11, during a printing operation in the direction of an advancing motion of the print head 11 (the motion of the same from a left side to a right side as viewed in FIGS. 4A and 4B), the ink droplets A are ejected from an area on the card C to an area beyond a front side edge portion C2 of the card C so as to prevent the ink droplets A from being ejected onto a rear side edge portion C1. Similarly, also during a printing operation in the direction of a returning motion of the print head 11, the ink droplets A are ejected from an area on the card C to an area beyond a front side edge portion C2 of the card C so as to prevent the ink droplets A from being ejected onto a rear side edge portion C1. In other words, a printing method is employed in which beyond-edge printing is carried out only immediately before termination of the ejection of the ink droplets A both when the print head 11 is advanced and when the print head 11 is returned, whereas immediately after the start of the ejection of the ink droplets A, beyond-edge printing is not carried out.

Figure 5A:
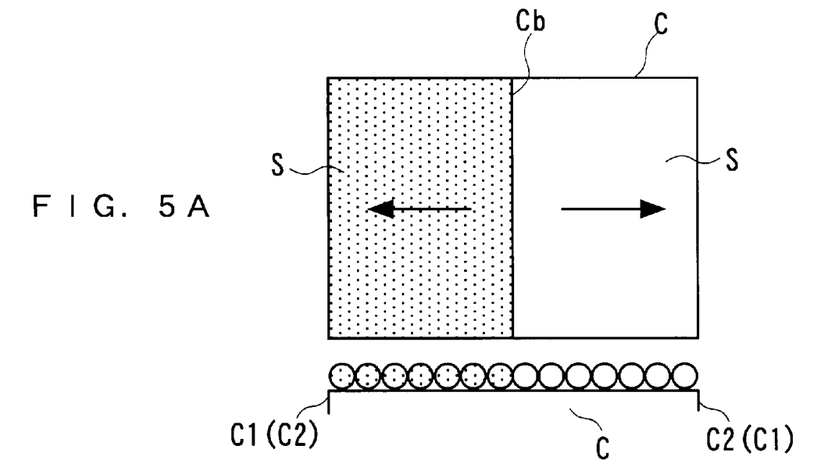
FIGS. 5A to 5C are diagrams which are useful in explaining three methods of the beyond-edge printing in the card printing apparatus.
Figure 5B:
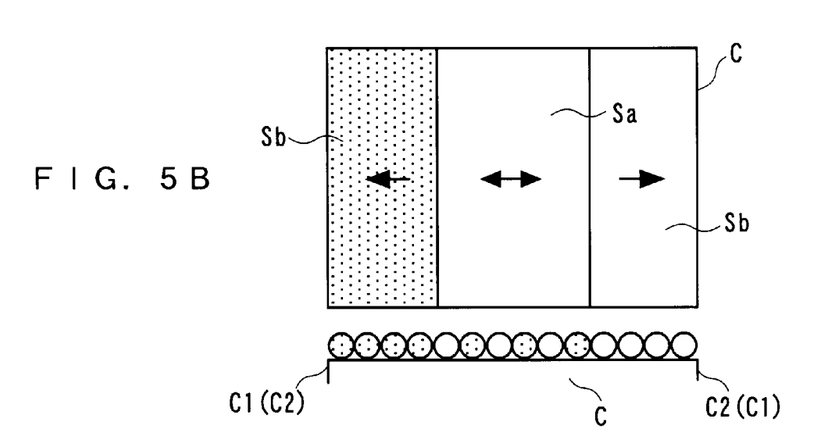
Figure 5C:
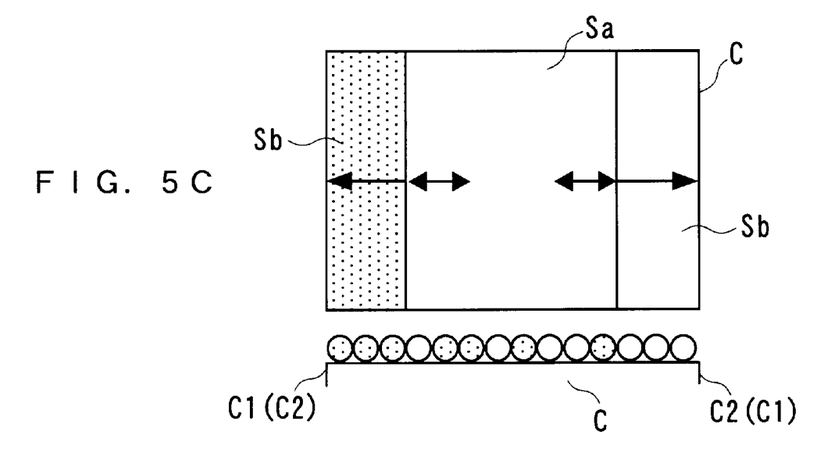

FIGS. 5A to 5C represent the above printing method in a further detailed manner. In FIG. 5A, a whole printing area of the card C is divided into two areas S and S to be printed during the advancing and returning motions of the print head 11, respectively, such that beyond-edge printing is performed forward of a center line Cb of the card C in the direction of the width thereof. That is, a front half of the card C is printed during the advancing motion of the print head 11 and similarly, a front half (the other half) of the card C is printed during the returning motion of the print head such that consequently, the whole printing area of the card C can be printed. Although in the present embodiment, the left and right printing areas S and S are divided by the center line Cb of the card C, a boundary dividing between the printing areas is not necessarily required to be the center line Cb.

On the other hand, in FIG. 5B, portions printed in beyond-edge printing during the advancing motion of the print head 11 and in beyond-edge printing during the returning motion of the print head 11 overlap each other at an intermediate portion of the card C. In this case, if the beyond-edge printing operations are simply carried in a manner causing the above printed portions to overlap each other, an overlapping portion Sa comes to be printed with a higher print density than non-overlapping portions Sb. To eliminate this inconvenience, an amount of the ink droplets A ejected onto the overlapping portion Sa per unit image and an amount of the ink droplets A ejected onto each non-overlapping portion Sb per unit image are controlled to be equal to each other. More specifically, in each of the printing operations carried out during the advancing and returning motions of the print head 11, the amount of ink ejected onto the overlapping portion Sa per unit image is controlled to be equal to one half of the amount of ink ejected onto each non-overlapping portions Sb per unit image. However, in the overlapping portion Sa, the amount of ink ejected during an advancing motion of the print head and the amount of ink ejected during a returning motion of the print head are not necessarily equal. Thus, it is possible to form a whole image in which an image printed on the overlapping portion Sa and an image printed on each non-overlapping portion Sb can be identical in color perception and are equal in print quality to each other.

In FIG. 5C, in each of the printing operations carried out during the advancing and returning motions of the print head 11, an amount of ink ejected per unit image is increased progressively (stepwise, continuously) as the printing area is sifted from an overlapping portion Sa toward a non-overlapping portion Sb, whereby a whole amount of the ink droplets A ejected onto the overlapping portion Sa per unit image is controlled to be equal to a whole amount of the ink droplets A ejected onto each non-overlapping portions Sb per unit image.

Figure 6A:
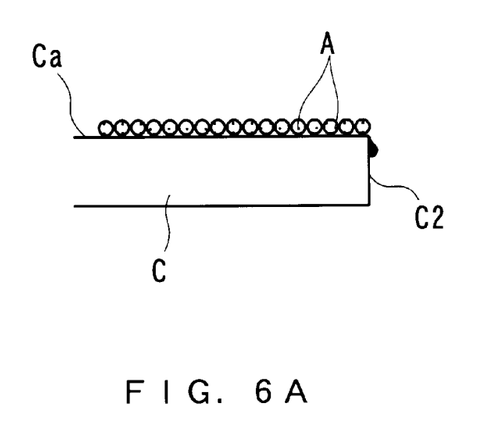
FIGS. 6A and 6B are diagrams which are useful in explaining the relation ship between sizes of ink droplets ejected from a print head and an edge portion of a card.
Figure 6B:
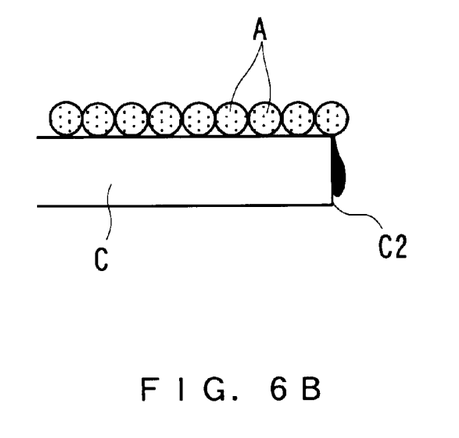

Further, as shown in FIGS. 6A and 6B, in the present embodiment, by ejecting a lot of small ink droplets A are ejected, a flow of ink (trickling of ink) from an edge portion of the card C to a side end face C2 thereof is controlled to be minimized (FIG. 6A). That is, the print head 11 is controlled to discharge very fine ink droplets A which, for instance, are equal in diameter to minimum dots the print head allows. FIG. 6B shows a state in which normal ink droplets A are ejected on the card C. In this case, the ink droplets A are large in size, and an amount of flow of ink (amount of trickling ink) from the edge portion of the card C to the side end face C2 thereof is increased. Further, it is preferred that the amount of ink ejected per unit image in FIG. 6A is equal to the amount of ink ejected per unit image in FIG. 6B. Further, the ink droplets A may be controlled to be fine when the printing operation is to be carried out on an edge portion of the card C.

Figure 7A:
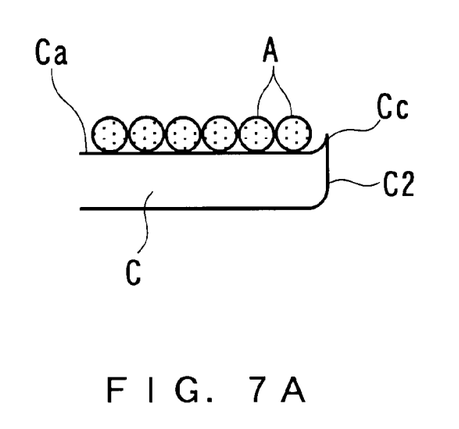
FIGS. 7A and 7B are diagrams which are useful in explaining the relationship between ink droplets and a surface formed with a droop portion, of a card.
Figure 7B:
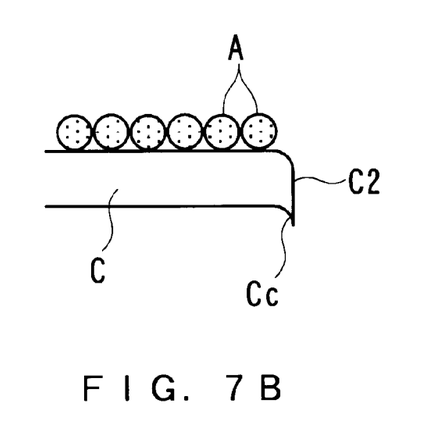

Now, as shown in FIGS. 7A and 7B, when a card C is formed by blanking, a droop portion Cc in the form of burrs is created at an edge portion of the card C. In the present embodiment, beyond-edge printing is carried out by employing a droop surface side having the droop portion Cc thereon as a recording surface Ca (FIG. 7A). This makes it possible to cause the droop portion Cc to function as a wall for preventing the ink droplets A adhering to a side edge portion of the card C from trickling down to a side end face C2 of the card C. FIG. 7B shows a case in which beyond-edge printing is carried out on a surface opposite to the droop surface. In this case, it becomes easy for the ink droplets A to trickle down the side end face C2 of the card C. Although in a case of the both surfaces of the card C being printed, there is no choice of surfaces to be printed, when only one surface is subjected to beyond-edge printing, the droop surface side is used as this surface i.e. recording surface Ca for the beyond-edge printing.

As described hereinbefore, according to the present embodiment, beyond-edge printing is carried out by changing printing areas depending on whether the print head 11 is advanced or returned, and hence it is possible to prevent the ink droplets A from directly hitting the side end faces C1 and C2 of the card C, thereby preventing or minimizing the possibility of adhesion of ink to the side end faces C1 and C2 of the card C.

Figure 8:
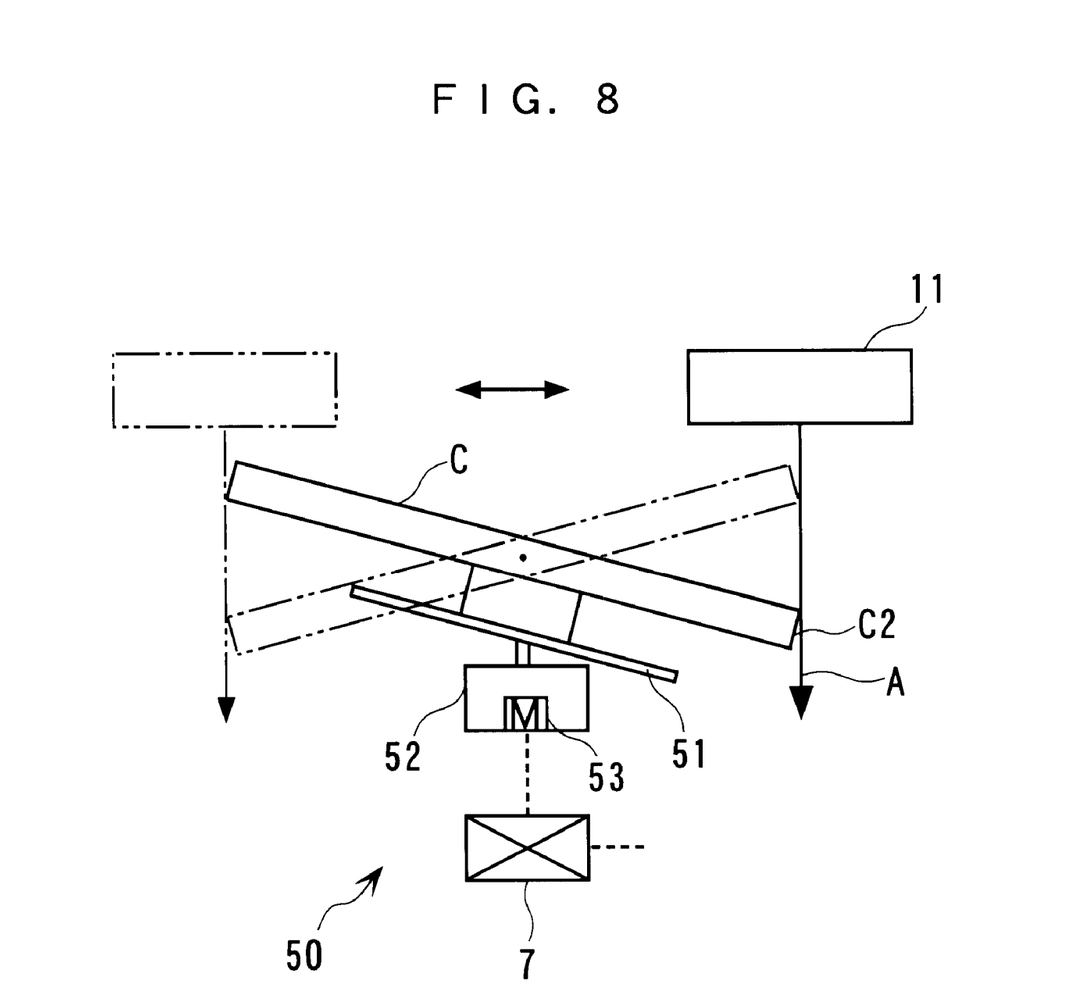
FIG. 8 is a diagram schematically showing a part of the construction of a card printing apparatus according to a second embodiment.

Next, a second embodiment of the invention will be described with reference to FIG. 8. In this embodiment, the card C is tilted in a left-right direction in synchronism with reciprocating motion of the print head 11. In this embodiment, the above-mentioned feed roller means 32 and delivery roller means 33 and the like are supported on a base frame 51 which is connected to a tilting mechanism 50 for tilting the card C leftward and rightward with respect to the location of the center of the card C in a left-right direction. The tilting mechanism 50 includes a link mechanism 52 for tilting the card C, and a tilting motor 53 for actuating the link mechanism 52. The tilting motor 53 is connected to the controller 7 described hereinabove.

The controller 7 drives the tilting motor 53 in a manner synchronous with reciprocation of the print head 11, thereby tilting the card C in a direction of movement of the print head 11 such that the card C slopes downward in this direction. In short, the card C is performs seesawing motion in synchronism with reciprocation of the print head 11. Therefore, when beyond-edge printing is carried out on each edge portion of the card C, the ink droplets A hit the edge portion at a small angle from a slanting direction, thereby positively preventing the ink droplets A from adhering to the side edge portion C2 of the card C. This makes it possible to positively prevent adhesion of ink to the side edge portions C1 and C2 of the card C.

Figure 9:
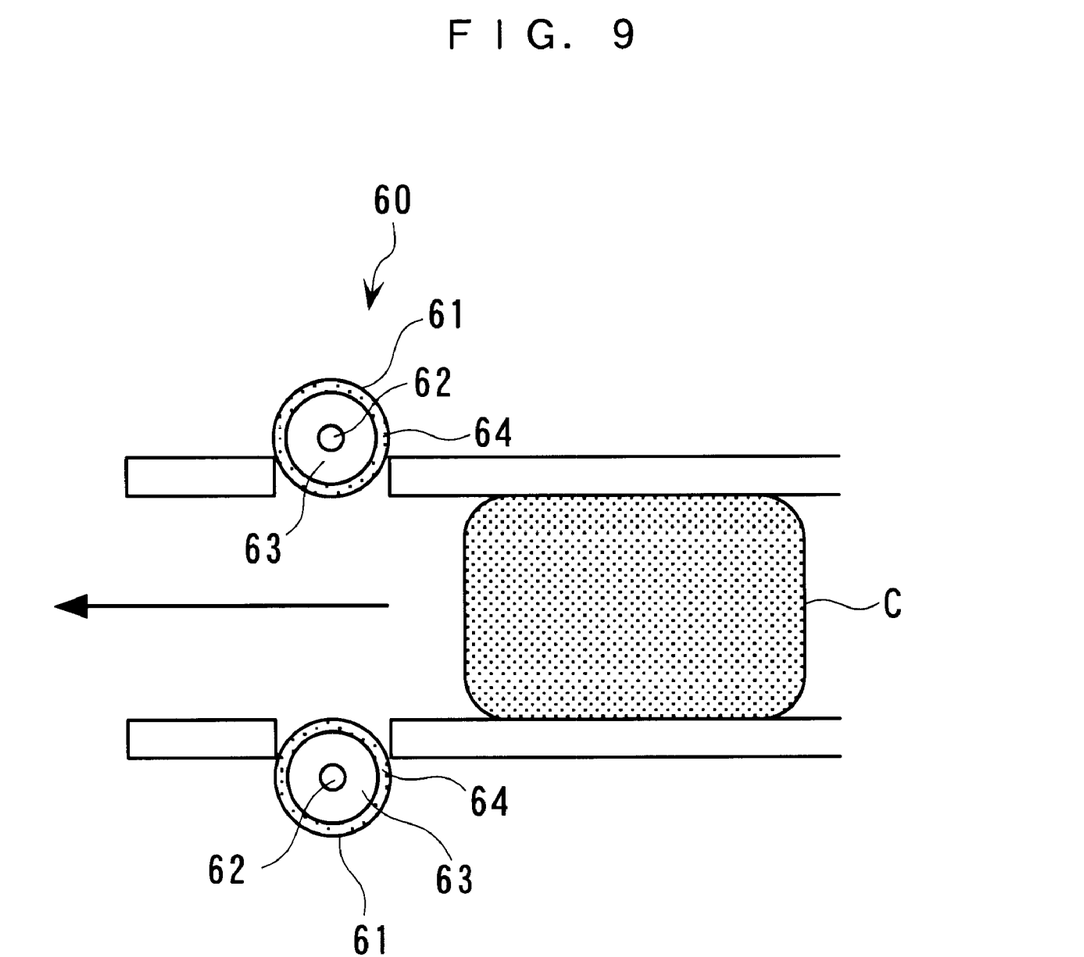
FIG. 9 is a diagram schematically showing a part of the construction of a card printing apparatus according to a third embodiment.

Next, a third embodiment of the invention will be described with reference to FIG. 9. In this embodiment, ink which has adhered to the side edge portions C1 and C2 of the card C is wiped off before the card C is delivered out of the apparatus. A wiping device 60 is interposed between the delivery roller means 33 and the card exit 4. The wiping device 60 is comprised of a pair of left and right wiping rollers 61 and 61. The pair of wiping rollers 61 and 61 face a feed path of the card C from respective transverse (left-right) directions, and brakingly rotates as the card C passes.

Each wiping roller 61 is comprised of a support shaft 62 attached to a frame, not shown, and a roller body 63 brakingly rotates with respect to the support shaft 62. As the card C is advanced, the roller bodies 63 are brought into rolling contact with the card C, whereby wiping members 64 arranged on respective outer peripheries of the roller bodies 63 are brought into sliding contact with the side end faces C1 and C2 of the card C, thereby wiping ink from the side edge portions C1 and C2. Therefore, even if ink adheres to the opposite side end faces C1 and C2 during printing, it is possible to wipe off the ink from the side edge portions C1 and C2 as the card C is sent out of the apparatus.

Figure 10:
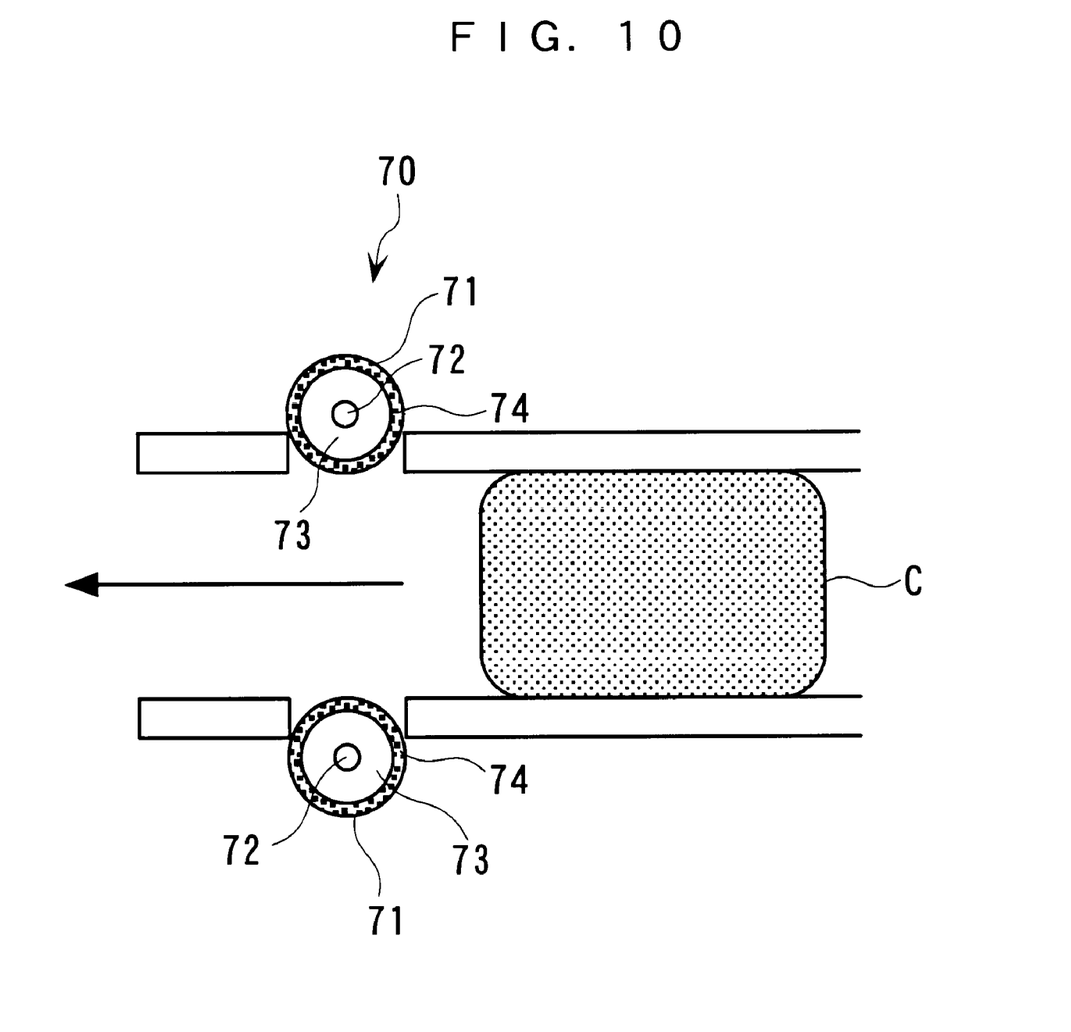
FIG. 10 is a diagram schematically showing a part of the construction of a variation of the card printing apparatus according to the third embodiment.

FIG. 10 shows a variation of the third embodiment described above. In this variation, a scraping device 70 is arranged which includes grinding rollers 71 and 71 in place of the wiping rollers 61 and 61 described above. Each of the grinding rollers 71 and 71 includes a grinding member 74 on an outer periphery of a roller body 73 which brakingly rotates with respect to a support shaft 72. In this example, as the card C is advanced, the roller bodies 73 are brought into rolling contact with the card C, whereby the grinding members 74 chip off ink adhering to the side edge portions C1 and C2 of the card C. It should be noted that the third embodiment can be applied to a card printing apparatus which does not assume a special printing mode for printing as in the case of the first embodiment.

Figure 11:
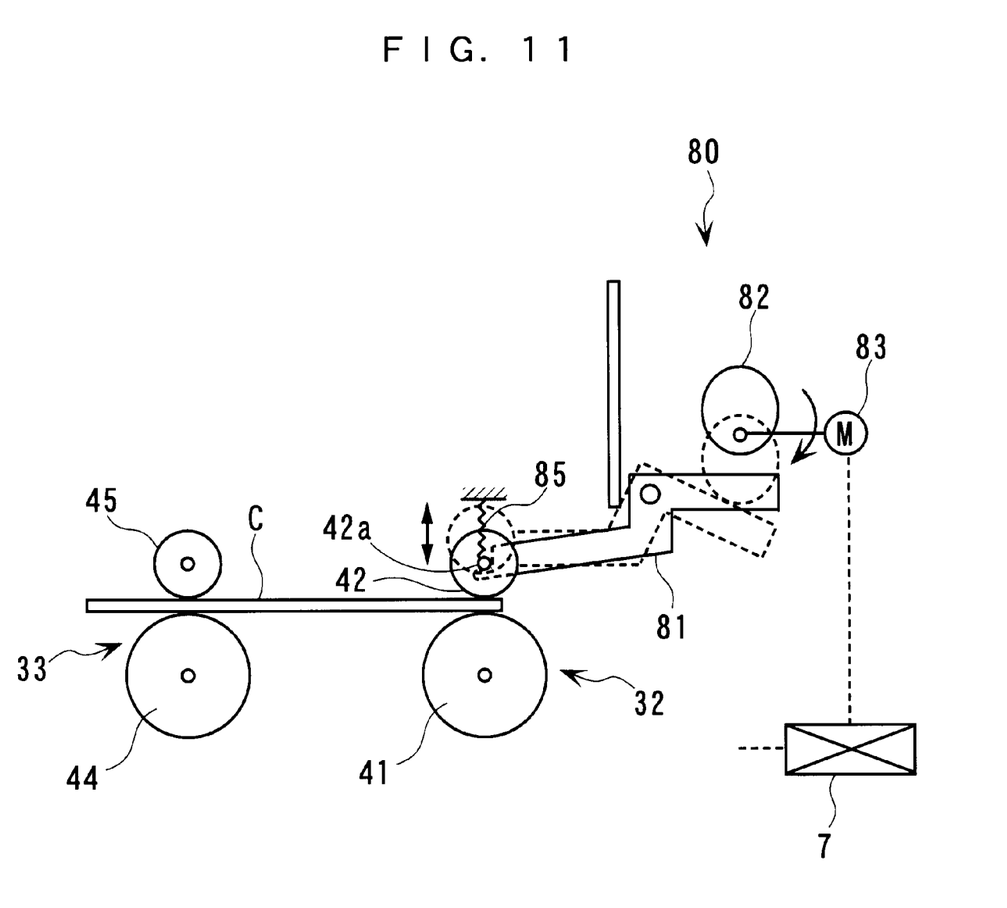
FIG. 11 is a diagram schematically showing a part of the construction of a card printing apparatus according to a fourth embodiment.

Next, a fourth embodiment of the invention will be described with reference to FIG. 11. As described above, the card C has a predetermined thickness. Therefore, as the card C is advanced, and when the trailing edge portion of the card C leaves the feed roller means 32, the urging force (urging force by a spring) of the feed driven roller 42 applied to the feed drive roller 41 acts on the card C in a manner flicking the card C forward. The card C which is sandwiched and urged by the delivery roller means 33 on a front side thereof is flicked by the feed roller means 32, and slightly advanced in a slipping manner. At this time, if the printing operation is continued, thinned dots are printed on the card C. To overcome this problem, in this embodiment, an urging-force release mechanism 80 is arranged which releases the card C from the state held and urged by the feed driven roller 42 when the trailing edge portion of the card C leaves the feed roller means 32.

The urging-force release mechanism 80 includes a pivot arm (release arm) 81 for spacing the feed driven roller 42 from the feed drive roller 41, a cam 82 for causing the pivot arm 81 to be pivotally moved, and a release motor 83 for rotating the cam 82. The pivot arm 81 has one end portion thereof engaged with a support shaft 42a of the feed driven roller 42, the other end portion thereof brought into contact with the cam 82 and an intermediate portion thereof pivotally supported on a frame, not shown. In this embodiment, the pivot arm 81 causes the feed driven roller 42 to move upward and downward between a rolling contact position and a spaced position. On the other hand, the release motor 83 is connected to the above-mentioned controller 7 which detects a timing at which the trailing edge portion of the card C leaves the feed roller means 32, based on the number of feeding steps and a feed time period of the feed roller means (the feed motor 35) 32, and drives the release motor 83 at the timing.

When the release motor 83 is driven, the cam 82 is driven for rotation via a speed reduction mechanism, not shown. The rotation of the cam 82 causes the pivotal movement of the pivot arm 81. When the pivot arm 81 is driven for operation, the feed driven roller 42 is moved upward against a spring 85 to be slightly spaced from the trailing edge portion of the card C. As a result, the trailing edge portion of the card C is released, and the card C is advanced by the delivery roller means 33.

As described hereinabove, the urging-force release mechanism 80 is incorporated in the feed roller means 32, whereby the card C having a predetermined thickness is prevented from being flicked by the feed roller means 32. Hence, a faulty printing operation can be prevented even if the trailing edge portion of the card C leaves the feed roller means 32 during printing operation (especially, beyond-edge printing). It should be noted that a solenoid may be used as a drive source in place of the release motor 83. In this case, the pivot arm 81 is connected to a plunger of the solenoid. Further, although in the above case, the feed driven roller 42 is moved upward by the pivot arm 81, this is not limitative, but the support shaft 42a of the feed driven roller 42 may be supported from below and a spring force of the spring 85 man be caused to escape to the pivot arm 81 (in this case, the pivot arm 81 is engaged with and disengaged from the feed driven roller 42 via the support shaft 42a). Furthermore, the apparatus may be configured such that a stator of the spring 85 is lifted by the pivot arm 81.

As described hereinbefore, according to the card printing method and card printing apparatus of the invention, beyond-edge printing for printing on the edge portions of a card is carried out immediately before termination of ejection of the ink droplets during both the advancing motion and returning motion of the print head. Hence, it is possible to prevent the ink droplets from directly hitting end faces of the card, there by preventing or minimizing the possibility of adhesion of ink to the end faces of the card. Therefore, it is possible to enhance the print quality of the card.

According to another card printing apparatus of the invention, the card feeding operations of the feed roller means and the delivery roller means are controlled when the print head is being executing a printing operation, so that it is possible to prevent thinned dots from being caused when beyond-edge printing is effected on opposite edge portions on a front end and a rear end of the card in the direction of feed of the card. This enables the print quality of the card to be enhanced.

It is further understood by those skilled in the art that the foregoing are preferred embodiments of the invention, and that various changes and modifications may be made without departing from the spirit and scope thereof.

What is claimed is:

1. A method of printing on a card having a predetermined thickness by using a print head by an ink jet printing method, the method comprising the steps of:

reciprocatingly moving said print head; and carrying out beyond-edge printing in which ink droplets are ejected beyond opposite edges of said card, immediately before termination of ejection of said droplets when said print head is moved in one direction, and immediately before termination of ejection of said droplets when said print head is moved in another direction opposite to said one direction.

2. A method according to claim 1, wherein a printing area printed when said print head is moved in said one direction and a printing area printed when said print head is moved in said another direction opposite to said one direction extend from an intermediate portion of said card to said opposite edges of said card.

3. A method according to claim 1, wherein a printing area printed when said print head is moved in said one direction and a printing area printed when said print head is moved in said another direction opposite to said one direction overlap each other to form an overlapping area.

4. A method according to claim 3, wherein an amount of ink droplets ejected onto said overlap area per unit image and an amount of ink droplets ejected onto each non-overlapping area per unit image are adjusted to an identical amount.

5. A method according to claim 1, wherein said printing is carried out by using a surface of said card having a droop portion formed thereon by blanking, as a recording surface for said printing.

6. A method according to claim 1, including the step of tilting said card in a direction of movement of said print head such that said card lowers in a direction of movement during each printing operation carried out when said print head is moved in said one direction and when said print head is moved in said another direction opposite to said one direction.

7. A method according to claim 1, wherein said print head ejects ink droplets adjusted to be very fine, at least when printing is carried out on each of said opposite edges of said card.

8. A method according to claim 1, including the step of wiping off ink adhering to end faces at said opposite edges of said card while advancing said card after termination of printing.

9. A method according to claim 1, including the step of scraping ink adhering to end faces at said opposite edges of said card while advancing said card after termination of printing.

10. A card printing apparatus for printing on a card having a predetermined thickness by an ink jet printing method, the card printing apparatus comprising:

a card feed mechanism for feeding said card;

a print head for carrying out printing on said card being advanced, while performing reciprocating motions; and a controller for controlling said card feed mechanism and said print head, said controller causing said print head to carry out beyond-edge printing in which ink droplets are ejected beyond opposite edges of said card, immediately before termination of ejection of said droplets when said print head is moved in one direction, and immediately before termination of ejection of said droplets when said print head is moved in another direction opposite to said one direction.

11. A card printing apparatus according to claim 10, wherein said controller controls said card feed mechanism and said print head such that a printing area printed when said print head is moved in said one direction and a printing area printed when said print head is moved in said another direction opposite to said one direction extend from an intermediate portion of said card to said opposite edges of said card.

12. A card printing apparatus according to claim 10, wherein said controller controls said card feed mechanism and said print head such that a printing area printed when said print head is moved in said one direction and a printing area printed when said print head is moved in said another direction opposite to said one direction overlap each other to form an overlapping area.

13. A card printing apparatus according to claim 12, wherein said controller adjusts an amount of ink droplets ejected onto said overlapping area per unit image and an amount of ink droplets ejected onto each non-overlapping area per unit image to an identical amount.

14. A card printing apparatus according to claim 10, wherein said card feed mechanism guides said card such that a surface of said card having a droop portion formed thereon by blanking, is used as a recording surface for printing.

15. A card printing apparatus according to claim 10, further including a tilting mechanism for tilting said card brought to said print head such that said card performs sea-sawing motion, said tilting mechanism tilting said card in a direction of movement of said print head such that said card lowers in a direction of movement during each printing operation carried out when said print head is moved in said one direction and when said print head is moved in said another direction opposite to said one direction.

16. A card printing apparatus according to claim 10, wherein said controller causes said print head to eject ink droplets adjusted to be very fine, at least when printing is carried out on each of said opposite edges of said card.

17. A card printing apparatus according to claim 10, further including a wiping device arranged to face said card being advanced by said card feed mechanism after termination of printing, for wiping off ink adhering to end faces at said opposite edges of said card.

18. A card printing apparatus according to claim 10, further including a scraping device arranged to face said card being advanced by said card feed mechanism after termination of printing, for scraping off ink adhering to end faces at said opposite edges of said card.

* * * * *